US012592882B2

(12) United States Patent
Pandey et al.

(10) Patent No.: US 12,592,882 B2
(45) Date of Patent: Mar. 31, 2026

(54) GROUP-BASED POLICY ENCODING FOR NETWORK VIRTUALIZATION OVERLAYS

(71) Applicant: Juniper Networks, Inc., Sunnyvale, CA (US)

(72) Inventors: Harish Pandey, Bangalore (IN); Vinod Kumar Mahadev Gornal, Sunnyvale, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 289 days.

(21) Appl. No.: 18/427,011

(22) Filed: Jan. 30, 2024

(65) Prior Publication Data

US 2025/0219936 A1      Jul. 3, 2025

Related U.S. Application Data

(60) Provisional application No. 63/616,394, filed on Dec. 29, 2023.

(51) Int. Cl.
| | |
|---|---|
| *H04L 45/00* | (2022.01) |
| *H04L 12/46* | (2006.01) |
| *H04L 45/50* | (2022.01) |
| *H04L 45/745* | (2022.01) |
| *H04L 69/22* | (2022.01) |

(52) U.S. Cl.
CPC .......... *H04L 45/34* (2013.01); *H04L 12/4633* (2013.01); *H04L 45/50* (2013.01); *H04L 45/745* (2013.01); *H04L 69/22* (2013.01)

(58) Field of Classification Search
CPC ....... H04L 45/34; H04L 45/50; H04L 45/745; H04L 12/4633; H04L 12/4641; H04L 69/22
See application file for complete search history.

(56) References Cited

U.S. PATENT DOCUMENTS

| | | | | |
|---|---|---|---|---|
| 10,938,716 | B1 * | 3/2021 | Chin ...................... | H04L 45/38 |
| 2018/0139191 | A1 * | 5/2018 | Shi ........................ | H04L 63/123 |
| 2024/0214242 | A1 * | 6/2024 | Ramaraj ............. | H04L 63/0263 |
| 2025/0219936 | A1 * | 7/2025 | Pandey .............. | H04L 12/4633 |
| 2025/0247321 | A1 * | 7/2025 | Tollet ................... | H04L 61/256 |

OTHER PUBLICATIONS

Extended European Search Report for European Application No. EP24165907 dated Jul. 29, 2024, 12 pages.

(Continued)

*Primary Examiner* — Jerry B Dennison
(74) *Attorney, Agent, or Firm* — Harrity & Harrity, LLP

(57) ABSTRACT

A first network device of a first data center may encode a source tenant system interface (TSI) group identifier into a tag protocol identifier and a group-based policy identifier, and may encode the tag protocol identifier and the group-based policy identifier into a virtual extensible local area network (VXLAN) packet with the source TSI group identifier, where the source TSI group identifier is not included in a header of the VXLAN packet. The first network device may provide the VXLAN packet, with the source TSI group identifier, to a second network device of a second data center, via an Ethernet virtual private network (EVPN) multiprotocol label switching (MPLS) network.

20 Claims, 10 Drawing Sheets

100 ——▸

Group based policy tag format

110 ——
| Tag Protocol Identifier (TPID) | Group Based Policy Identifier (GBP-Id) |
|---|---|

115

VXLAN packet with the group based policy tag

| Outer Ethernet header | Outer IP header | Outer UDP header | Outer VXLAN header | Inner Destination MAC | Inner Source MAC | VLAN Tag | TPID | GBP-Id | Inner Payload |
|---|---|---|---|---|---|---|---|---|---|

GBP tag is not part of the VXLAN header

(56)          References Cited

OTHER PUBLICATIONS

Lin, W., et al., "Group Policy ID Bgp Draft-wlin-bess-group-policy-id-extended-community 03: Draft-wlin-bess-group-policy-id-extended-community 03.Txt", Group Policy Id Bgp Extended Community Drapt Wlin Bess Group-policy Id Extended. Community 031 Draft-wlin-bess-group-policy-id-extended.Community 03.Txt: Bess, Internet Engineering Task Force, IETF: ST on. WITH Oct. 20, 2023 (Oct. 20, 2023), pp. 1-8, XP015162847, Retrieved from the Internet: URL:https://tools.ietf.org/html/draft-wlin -bess-group-policy-id-extended community-03.

Smith Cisco Systems M., et al., "VXLAN Group Policy Option; draft-smith-vxlan-group-policy-05.txt", Internet Engineering Task Force, Internet Engineering Task Force, IETF Standardworkingdraft, Internet Society (ISOC) 4, Rue Des Palaises Ch-1205 Geneva, Switzerland, No. 5, Oct. 22, 2018 (Oct. 22, 2018), pp. 1-6, XP015129490, [retrieved on 2018-10-221 sections 1 to 51 p. 2 p. 5.

* cited by examiner

100 ⟍

120
Provide the VXLAN packet to a gateway of the first data center

125
Decapsulate the VXLAN packet and encapsulate into an EVPN MPLS packet

130
Provide EVPN MPLS packet to an EVPN MPLS network

140
Decapsulate the EVPN MPLS packet and encapsulate into the VXLAN packet

135
Receive EVPN MPLS packet from EVPN MPLS network

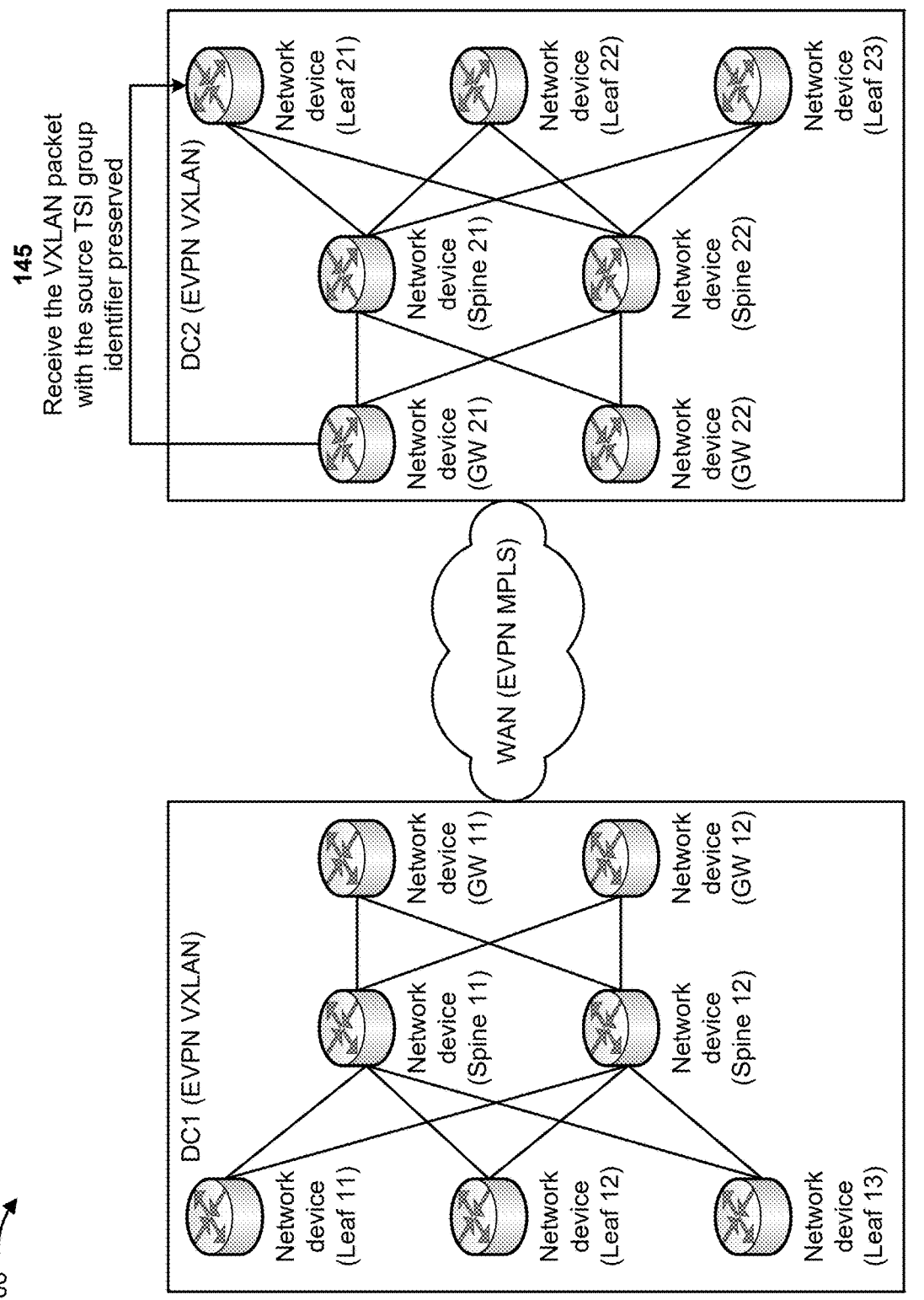

145
Receive the VXLAN packet with the source TSI group identifier preserved

DC2 (EVPN VXLAN)

Network device (Leaf 21)

Network device (Leaf 22)

Network device (Leaf 23)

Network device (Spine 21)

Network device (Spine 22)

Network device (GW 21)

Network device (GW 22)

WAN (EVPN MPLS)

DC1 (EVPN VXLAN)

Network device (GW 11)

Network device (GW 12)

Network device (Spine 11)

Network device (Spine 12)

Network device (Leaf 11)

Network device (Leaf 12)

Network device (Leaf 13)

Apply a policy associated with the source TSI group identifier of the VXLAN packet

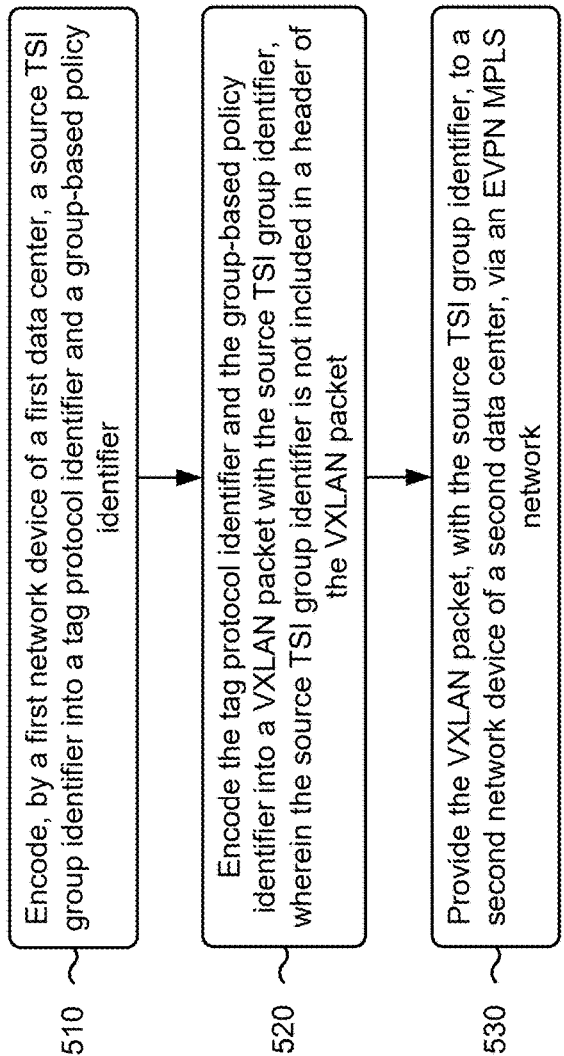

510 — Encode, by a first network device of a first data center, a source TSI group identifier into a tag protocol identifier and a group-based policy identifier 520 — Encode the tag protocol identifier and the group-based policy identifier into a VXLAN packet with the source TSI group identifier, wherein the source TSI group identifier is not included in a header of the VXLAN packet 530 — Provide the VXLAN packet, with the source TSI group identifier, to a second network device of a second data center, via an EVPN MPLS network

500

FIG. 5

GROUP-BASED POLICY ENCODING FOR NETWORK VIRTUALIZATION OVERLAYS

CROSS-REFERENCE TO RELATED APPLICATION

This patent application claims priority to U.S. Provisional Patent Application No. 63/616,394, filed on Dec. 29, 2023, entitled "GROUP-BASED POLICY ENCODING FOR NETWORK VIRTUALIZATION OVERLAYS," and assigned to the assignee hereof. The disclosure of the prior application is considered part of and is incorporated by reference into this patent application.

BACKGROUND

A group-based policy (GBP) model may define an application-centric or a business function-centric policy model in virtual extensible local area network (VXLAN) deployments where endpoint (e.g., endpoint device) or application network access policy is independent of an underlying network topology. This helps to achieve macro-segmentation and micro-segmentation behaviors consistently across the network at scale and with minimal policy.

SUMMARY

Some implementations described herein relate to a method. The method may include encoding, by a first network device of a first data center, a source tenant system interface (TSI) group identifier into a tag protocol identifier and a group-based policy identifier, and encoding the tag protocol identifier and the group-based policy identifier into a VXLAN packet with the source TSI group identifier, where the source TSI group identifier is not included in a header of the VXLAN packet. The method may include providing the VXLAN packet, with the source TSI group identifier, to a second network device of a second data center, via an Ethernet virtual private network (EVPN) multiprotocol label switching (MPLS) network.

Some implementations described herein relate to a first network device of a first data center. The first network device may include one or more memories and one or more processors. The one or more processors may be configured to encode a source TSI group identifier into a tag protocol identifier and a group-based policy identifier, and encode the tag protocol identifier and the group-based policy identifier into a VXLAN packet with the source TSI group identifier, where the source TSI group identifier is not included in a header of the VXLAN packet. The one or more processors may be configured to provide the VXLAN packet, with the source TSI group identifier, to a second network device of a second data center, via an EVPN MPLS network, where the second network device is to apply a policy associated with the source TSI group identifier of the VXLAN packet.

Some implementations described herein relate to a non-transitory computer-readable medium that stores a set of instructions. The set of instructions, when executed by one or more processors of a first network device of a first data center, may cause the first network device to encode a source TSI group identifier into a tag protocol identifier and a group-based policy identifier, and encode the tag protocol identifier and the group-based policy identifier into a VXLAN packet with the source TSI group identifier, where the source TSI group identifier is included in a payload of the VXLAN packet. The set of instructions, when executed by one or more processors of the first network device, may cause the first network device to provide the VXLAN packet, with the source TSI group identifier, to a second network device of a second data center, via an EVPN MPLS network.

BRIEF DESCRIPTION OF THE DRAWINGS

FIGS. 1A-1F are diagrams of an example associated with providing group-based policy encoding for network virtualization overlays.

FIG. 5 is a flowchart of an example process for providing group-based policy encoding for network virtualization overlays.

DETAILED DESCRIPTION

Figure 1A:
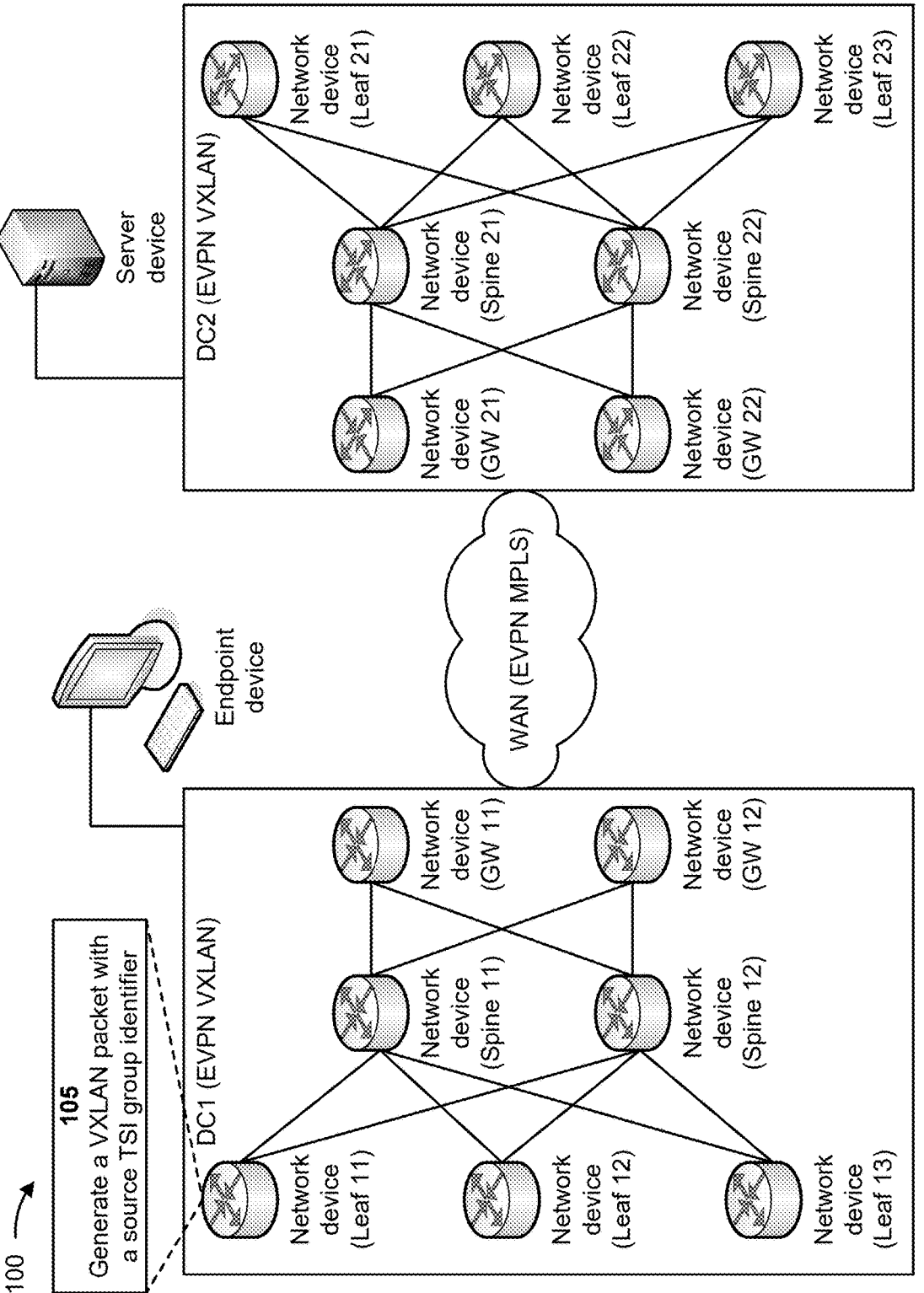

The following detailed description of example implementations refers to the accompanying drawings. The same reference numbers in different drawings may identify the same or similar elements.

The GBP model enables policies to be applied between groups of network endpoints. As users look beyond basic connectivity, richer network services with diverse implementations and network properties (e.g., service chaining, quality of service (QOS), path properties, access control, and/or the like) may be expressed via these policies. In the GBP model, tenant system interfaces (TSIs) may be assigned to TSI groups. Each TSI group may include TSIs that share the same network policies and requirements. Network policies may be defined between a TSI group of a traffic source and a TSI group of a traffic destination. These policies may be deployed when a TSI attaches to the network.

In many situations, a TSI-to-TSI group mapping may be known only at a network virtualization edge (NVE) to which the TSI is attached. Thus, a TSI group of a packet destination may not be known until the packet reaches an egress NVE to which the packet destination is attached. However, since a source TSI group identifier is removed from the packet during transit, a policy cannot be applied at the egress NVE. For example, a data center interconnect topology may include a first data center and a second data center executing EVPN VXLAN. The first data center and the second data center may be interconnected via a wide area network (WAN) executing EVPN MPLS. However, there are no mechanisms for transmitting a TSI group identifier (e.g., in a packet) from a leaf device of the first data center to a leaf device in the second data center.

Thus, current techniques for preserving group-based policies for network virtualization overlays consume computing resources (e.g., processing resources, memory resources, communication resources, and/or the like), networking resources, and/or the like, are associated with failing to retain a TSI group identifier provided in a packet, being unable to apply a policy associated with TSI group identifier, providing a poor user experience based on failing to apply the policy associated with the TSI group identifier, handling complaints associated with the poor user experience, and/or the like.

Some implementations described herein relate to a network device that provides group-based policy encoding for network virtualization overlays. For example, a first network device of a first data center may encoding a source TSI group identifier into a tag protocol identifier and a group-based policy identifier, and may encode the tag protocol identifier and the group-based policy identifier into a VXLAN packet with the source TSI group identifier. The source TSI group identifier may not be included in a header of the VXLAN packet. The first network device may provide the VXLAN packet, with the source TSI group identifier, to a second network device of a second data center, via an EVPN MPLS network.

In this way, the network device provides group-based policy encoding for network virtualization overlays. For example, a network device of a first data center may generate a packet that includes a TSI group identifier (e.g., but not provided in a header of the packet). The network device may provide the packet to a gateway of the first data center, and the gateway may decapsulate the packet to generate an EVPN MPLS packet with the TSI group identifier. The gateway may provide the EVPN MPLS packet to an EVPN MPLS network, and the EVPN MPLS network may provide the EVPN MPLS packet to a gateway of a second data center. The gateway of the second data center may decapsulate the EVPN MPLS packet to generate the packet with the TSI group identifier, and may provide the packet to a network device of the second data center. The network device may apply a policy associated with the TSI group identifier. This provides a way to seamlessly preserve the TSI group identifier in a packet transmitted between data centers and may be utilized with MPLS, VXLAN, generic routing encapsulation (GRE), and/or the like. Thus, the network device conserves computing resources, networking resources, and/or the like that would otherwise have been consumed by failing to retain a TSI group identifier provided in a packet, being unable to apply a policy associated with TSI group identifier, providing a poor user experience based on failing to apply the policy associated with the TSI group identifier, handling complaints associated with the poor user experience, and/or the like.

FIGS. 1A-1F are diagrams of an example 100 associated with providing group-based policy encoding for network virtualization overlays. As shown in FIGS. 1A-1F, example 100 includes an endpoint device associated with a first data center (DC1), a server device associated with a second data center (DC2), and a wide area network (WAN) (e.g., an EVPN VXLAN fabric). The first data center may include leaf network devices (e.g., Leaf 11, Leaf 12, and Leaf 13), spine network devices (e.g., Spine 11 and Spine 12), and gateway network devices (e.g., GW 11 and GW 12). The second data center may include leaf network devices (e.g., Leaf 21, Leaf 22, and Leaf 23), spine network devices (e.g., Spine 21 and Spine 22), and gateway network devices (e.g., GW 21 and GW 22). Further details of the endpoint device, the server device, the first data center, the second data center, and the WAN, and the network devices are provided elsewhere herein.

As shown in FIG. 1A, and by reference number 105, a first network device of the first data center may generate a VXLAN packet with a source TSI group identifier. For example, the first network device of the first data center may correspond to Leaf 11. In some implementations, the first network device may generate a VXLAN packet based on traffic received from the endpoint device. For example, the endpoint device may wish to communicate with the server device associated with the second data center. The endpoint device may generate traffic and may provide the traffic to the first data center. The first network device may receive the traffic from the endpoint device and may generate the VXLAN packet based on the traffic received from the endpoint device. In some implementations, the VXLAN packet may include a source TSI group identifier. The source TSI group identifier may identify a source TSI group with TSIs that share the same network policies and requirements. The network policies may be defined between the source TSI group and a destination of the VXLAN packet (e.g., a second network device (Leaf 21) of the second data center).

In some implementations, the first network device may generate the VXLAN packet by encoding the source TSI group identifier into a tag protocol identifier and a group-based policy identifier, and encoding the tag protocol identifier and the group-based policy identifier into a VXLAN packet payload (e.g., not in a header) or another type of packet payload (e.g., a multiprotocol label switching (MPLS) packet payload).

Figure 1B:
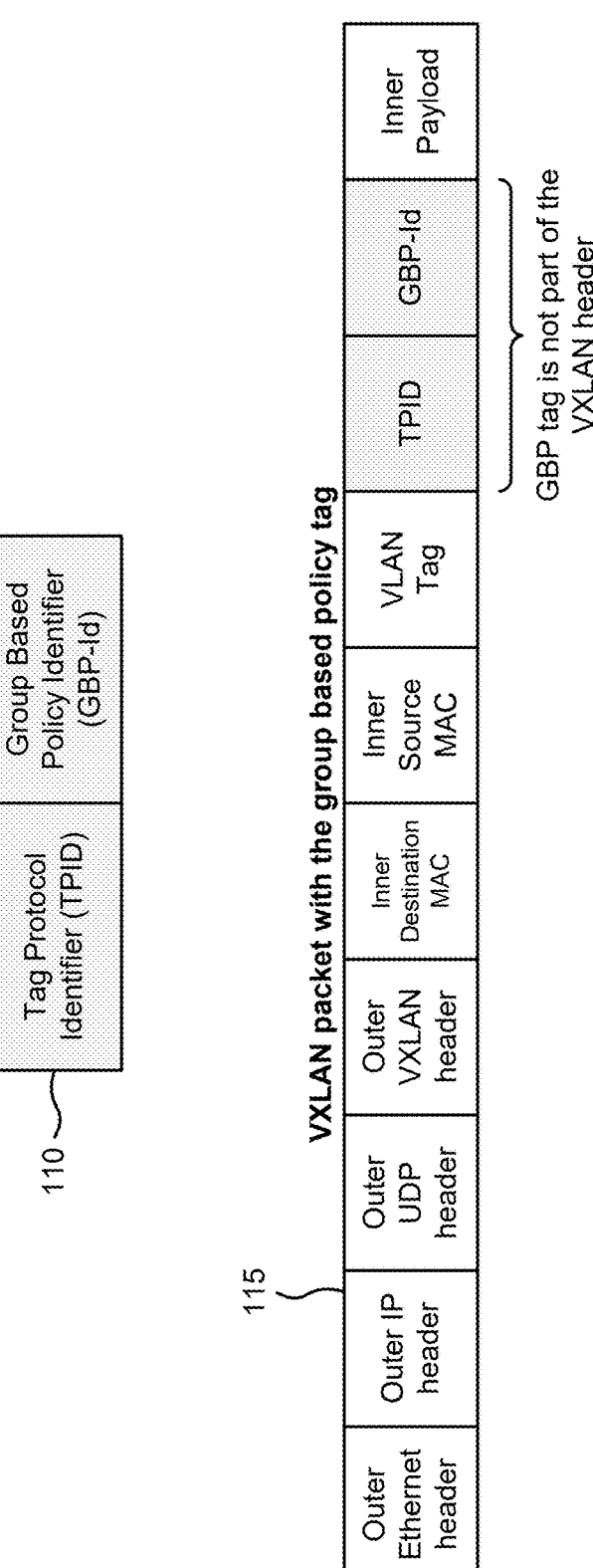

FIG. 1B depicts an example source TSI group identifier and an example VXLAN packet with the example source TSI group identifier. As shown in FIG. 1B, and by reference number 110, the source TSI group identifier may include a group-based policy (GPB) tag format with a tag protocol identifier (TPID) and a group-based policy identifier (GPB-Id). For example, the TPID (e.g., sixteen bits in length) may be dedicated for indicating a presence of the GPB-Id (e.g., twenty-four bits in length).

As further shown in FIG. 1B, and by reference number 115, the VXLAN packet may include an outer Ethernet header, an outer Internet protocol (IP) header, an outer user datagram protocol (UDP) header, an outer VXLAN header, an inner destination media access control (MAC) address, an inner source MAC address, a virtual local area network (VLAN) tag, the TPID, the GPB-Id, and an inner payload. The outer Ethernet header may include a source Ethernet address and a destination Ethernet address, and the outer IP header may include a source IP address and a destination IP address. The outer UDP header may include a default VXLAN destination UDP port number. The outer VXLAN header may include VXLAN information for the VXLAN packet. The inner destination MAC address may include a MAC address of a destination of the VXLAN packet. The inner source MAC address may include a MAC address of a source of the VXLAN packet. The VLAN tag may indicate that the VXLAN packet needs access to several networks at once using the same interface. As further shown in FIG. 1B, the GPB tag (e.g., the TPID and the GPB-Id) is not part of the VXLAN header, but rather part of the inner payload of the VXLAN packet. The inner payload may include data to be transmitted from the source to the destination.

Figure 1C:
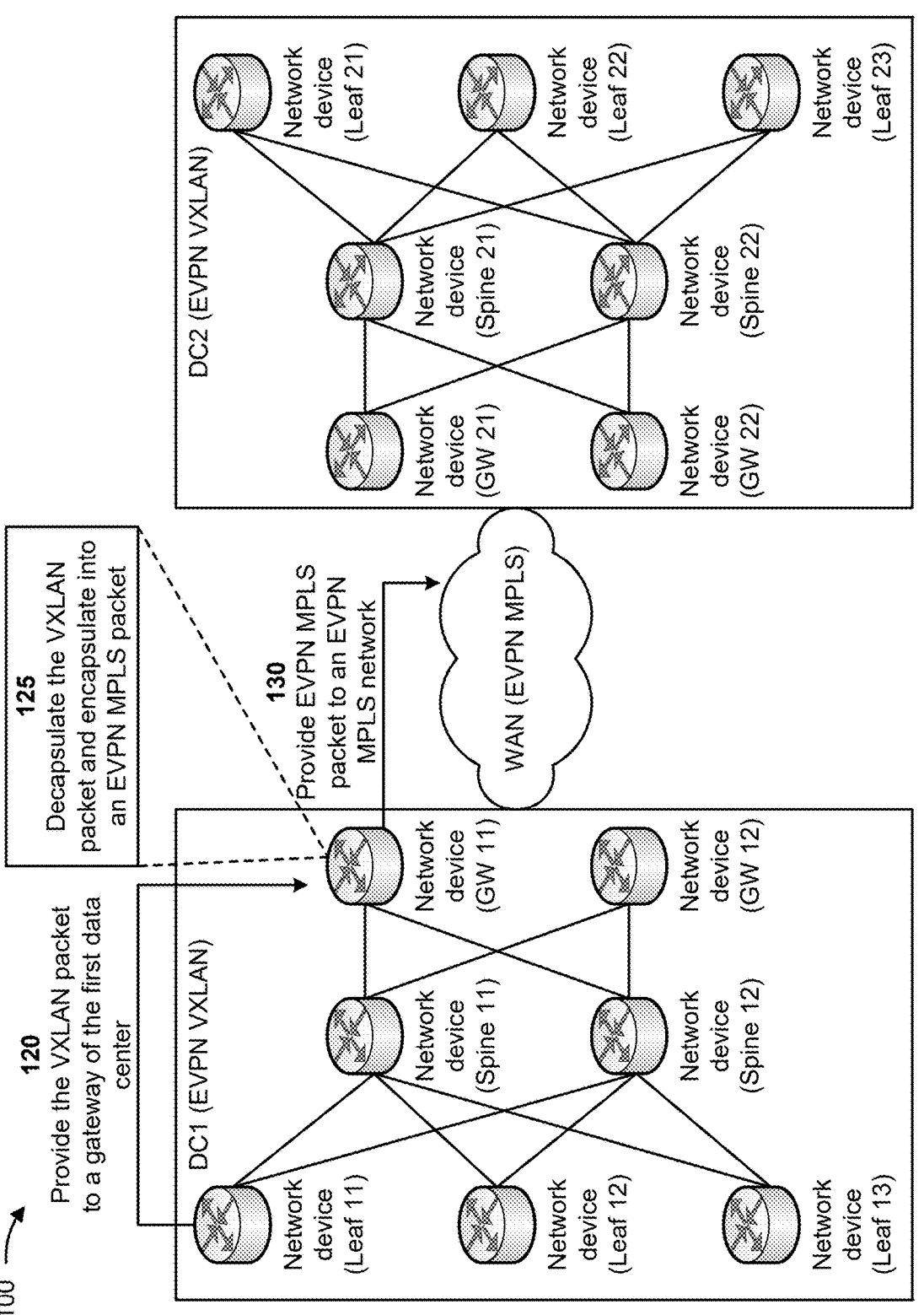

As shown in FIG. 1C, and by reference number 120, the first network device may provide the VXLAN packet to a first gateway of the first data center. For example, the first network device may forward the VXLAN packet on toward the destination of the VXLAN packet (e.g., the second network device (Leaf 21) of the second data center). Accordingly, the first network device may provide the VXLAN packet to a spine network device (e.g., Spine 11) of the first data center. The spine network device may provide the VXLAN packet to the first gateway (e.g., GW 11) of the first data center. The first gateway may receive the VXLAN packet from the spine network device.

As further shown in FIG. 1C, and by reference number 125, the first gateway may decapsulate the VXLAN packet and may encapsulate the packet into an EVPN MPLS packet. For example, the first gateway may decapsulate the VXLAN packet by removing header information from the VXLAN packet. In some implementations, the first gateway may remove the outer Ethernet header, the outer IP header, the outer UDP header, and the outer VXLAN header from the VXLAN packet. The first gateway may not remove the inner destination MAC address, the inner source MAC address, the VLAN tag, the TPID, the GPB-Id, and the inner payload from the VXLAN packet. The first gateway may encapsulate the inner destination MAC address, the inner source MAC address, the VLAN tag, the TPID, the GPB-Id, and the inner payload with an EVPN MPLS header (e.g., that includes the outer Ethernet header, the outer IP header, and MPLS headers) to generate the EVPN MPLS packet.

As further shown in FIG. 1C, and by reference number 130, the first gateway may provide the EVPN MPLS packet to the WAN (e.g., the EVPN MPLS network). For example, the first gateway of the first data center may provide the EVPN MPLS packet to the EVPN MPLS network, and the EVPN MPLS network may receive and route the EVPN MPLS packet to the second data center (e.g., via an EVPN MPLS tunnel provided in the WAN).

Figure 1D:
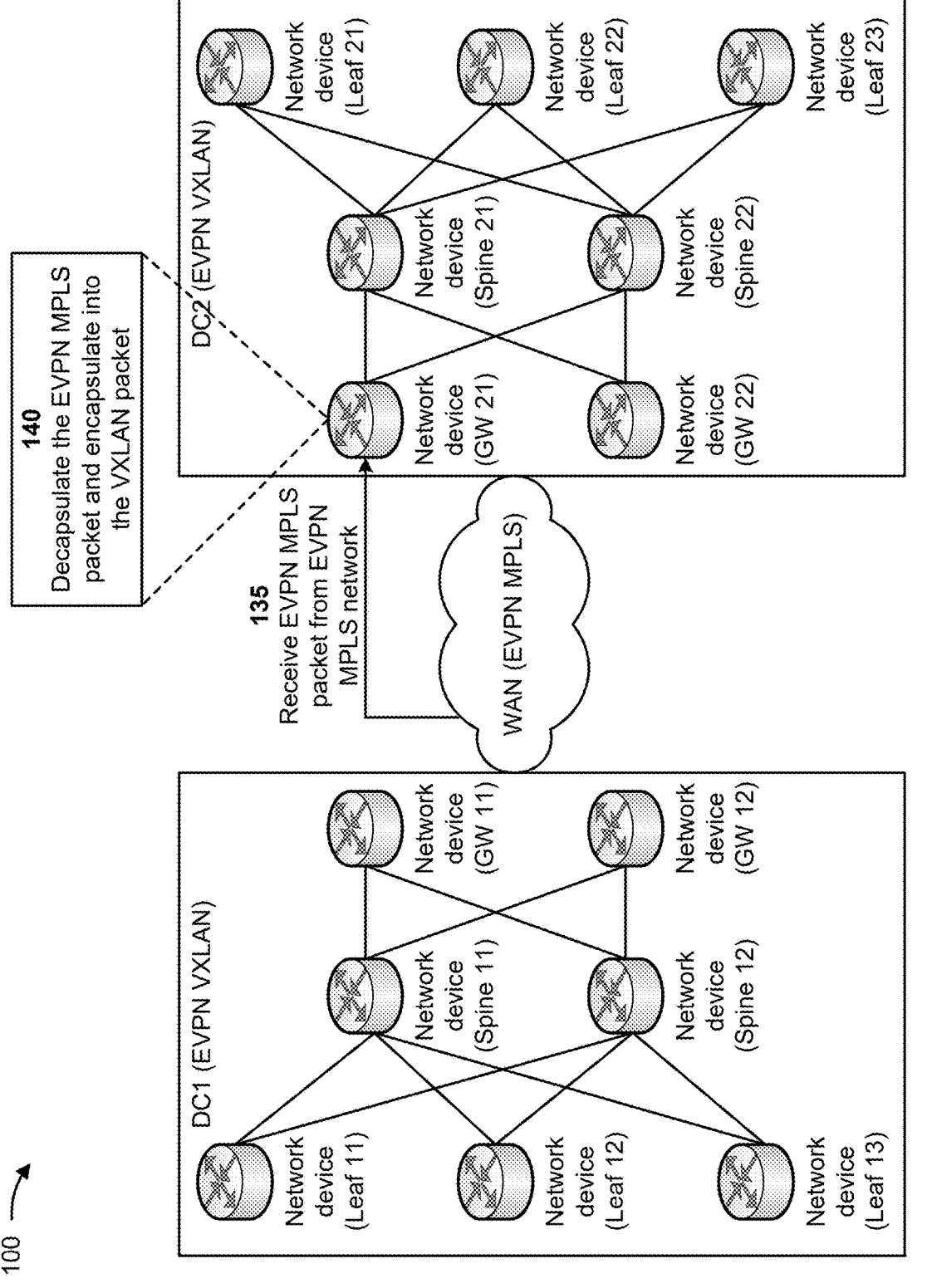

As shown in FIG. 1D, and by reference number 135, a second gateway of the second data center may receive the EVPN MPLS packet from the WAN (e.g., the EVPN MPLS network). For example, the EVPN MPLS network may route the EVPN MPLS packet to the second gateway (e.g., GW21) of the second data center since the second gateway is associated with the second network device (e.g., Leaf 21). The second gateway of the second data center may receive the EVPN MPLS packet from the EVPN MPLS network.

As further shown in FIG. 1D, and by reference number 140, the second gateway may decapsulate the EVPN MPLS packet and may encapsulate the packet into the VXLAN packet. For example, the second gateway may decapsulate the EVPN MPLS packet by removing the EVPN MPLS header information from the EVPN MPLS packet. The second gateway may not remove the inner destination MAC address, the inner source MAC address, the VLAN tag, the TPID, the GPB-Id, and the inner payload from the EVPN MPLS packet. The second gateway may encapsulate the inner destination MAC address, the inner source MAC address, the VLAN tag, the TPID, the GPB-Id, and the inner payload with the outer Ethernet header, the outer IP header, the outer UDP header, and the outer VXLAN header to generate the VXLAN packet.

As shown in FIG. 1E, and by reference number 145, a second network device of the second data center may receive the VXLAN packet with the source TSI group identifier preserved. For example, the second gateway may forward the VXLAN packet on toward the destination of the VXLAN packet (e.g., the second network device (Leaf 21) of the second data center). Accordingly, the second gateway may provide the VXLAN packet to a spine network device (e.g., Spine 21) of the second data center. The spine network device may provide the VXLAN packet to the second network device (e.g., Leaf 21) of the second data center. The second network device may receive the VXLAN packet from the spine network device. The VXLAN packet may include the TPID and the GPB-Id and thus may preserve the source TSI group identifier of the VXLAN packet.

Figure 1F:
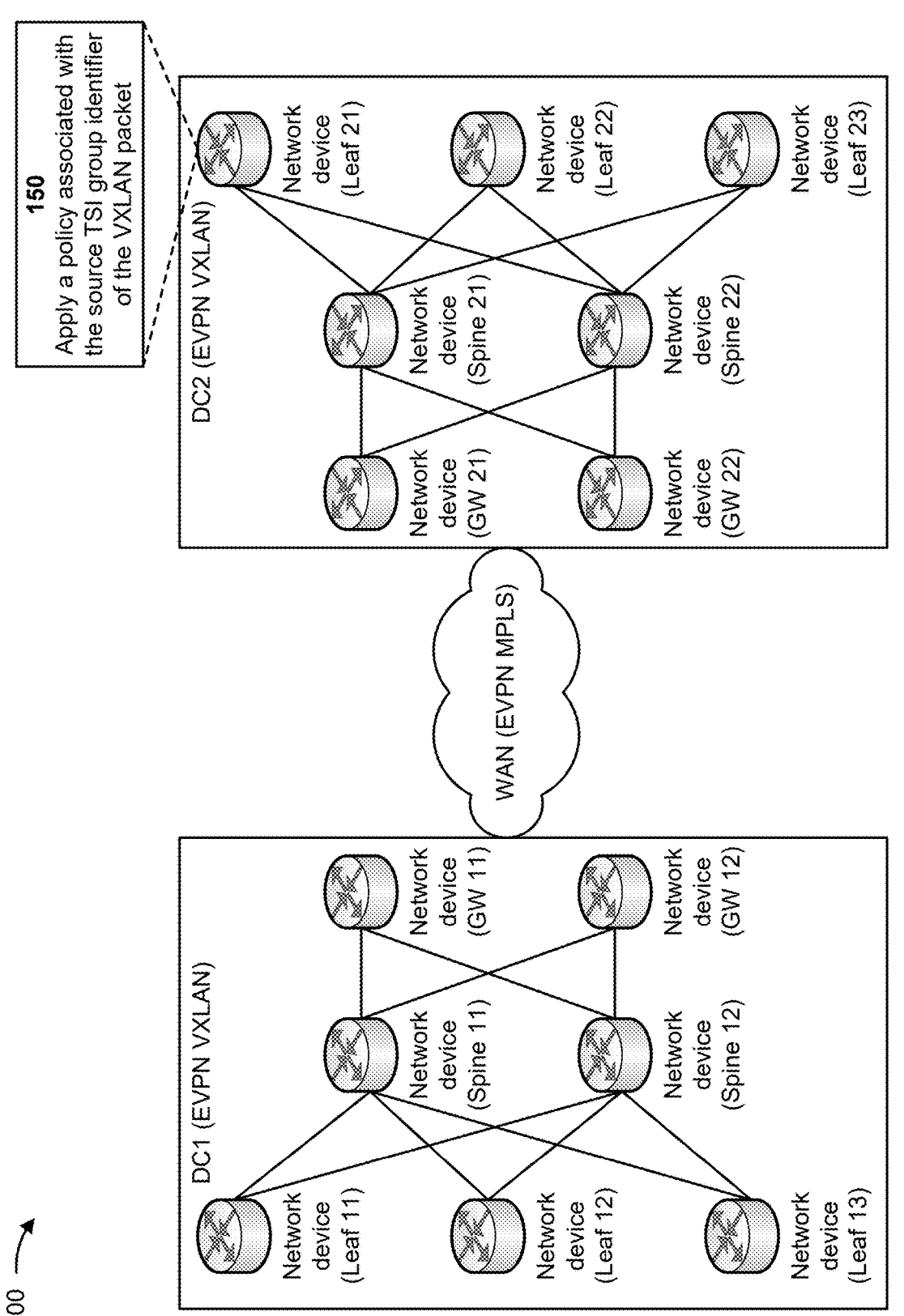

As shown in FIG. 1F, and by reference number 150, the second network device may apply a policy associated with the source TSI group identifier of the VXLAN packet. For example, the second network device (e.g., Leaf 21) may apply the policy associated with the TPID and the GPB-Id (e.g., the TSI group identifier) of the VXLAN packet. In some implementations, the policy may be associated with service chaining, quality of service, path properties, access control, and/or the like. In some implementations, the policy may include a tenant system security policy that defines what traffic can pass through the second network device and actions that need to take place on the traffic as the traffic passes through the second network device. The tenant security policy may enable the second network device to control traffic flow from zone to zone by defining the kinds of traffic permitted to pass from sources to destinations. Traffic may enter one security zone and may exit through another security zone.

In this way, the network device provides group-based policy encoding for network virtualization overlays. For example, a network device of a first data center may generate a packet that includes a TSI group identifier (e.g., but not provided in a header of the packet). The network device may provide the packet to a gateway of the first data center, and the gateway may decapsulate the packet to generate an EVPN MPLS packet with the TSI group identifier. The gateway may provide the EVPN MPLS packet to an EVPN MPLS network, and the EVPN MPLS network may provide the EVPN MPLS packet to a gateway of a second data center. The gateway of the second data center may decapsulate the EVPN MPLS packet to generate the packet with the TSI group identifier, and may provide the packet to a network device of the second data center. The network device may apply a policy associated with the TSI group identifier. This provides a way to seamlessly preserve the TSI group identifier in a packet transmitted between data centers and may be utilized with MPLS, VXLAN, GRE, and/or the like. Thus, the network device conserves computing resources, networking resources, and/or the like that would otherwise have been consumed by failing to retain a TSI group identifier provided in a packet, being unable to apply a policy associated with TSI group identifier, providing a poor user experience based on failing to apply the policy associated with the TSI group identifier, handling complaints associated with the poor user experience, and/or the like.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
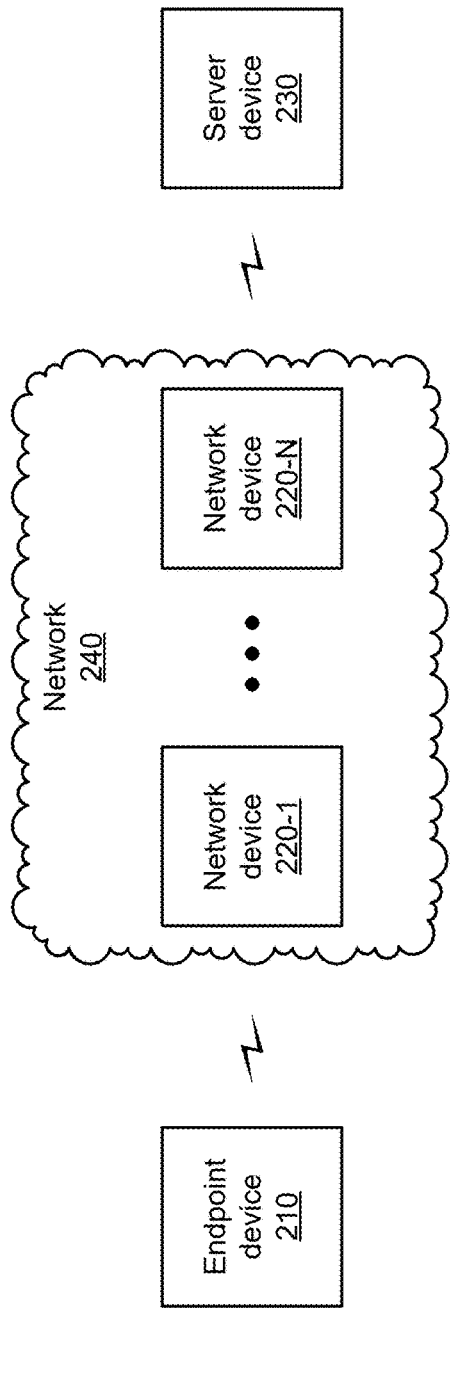
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include an endpoint device 210, a group of network devices 220 (shown as network device 220-1 through network device 220-N), a server device 230, and a network 240. Devices of the environment 200 may interconnect via wired connections, wireless connections, or a combination of wired and wireless connections.

The endpoint device 210 includes one or more devices capable of receiving, generating, storing, processing, and/or providing information, such as information described herein. For example, the endpoint device 210 may include a mobile phone (e.g., a smart phone or a radiotelephone), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device, a server device, a group of server devices, or a similar type of device. In some implementations, the endpoint device 210 may receive network traffic from and/or may provide network traffic to other endpoint devices 210 and/or the server device 230, via the network 240 (e.g., by routing packets using the network devices 220 as intermediaries).

The network device 220 includes one or more devices capable of receiving, processing, storing, routing, and/or providing traffic (e.g., a packet or other information or metadata) in a manner described herein. For example, the network device 220 may include a router, such as a label switching router (LSR), a label edge router (LER), an ingress router, an egress router, a provider router (e.g., a provider edge router or a provider core router), a virtual router, a route reflector, an area border router, or another type of router. Additionally, or alternatively, the network device 220 may include a gateway, a switch, a firewall, a hub, a bridge, a reverse proxy, a server (e.g., a proxy server, a cloud server, or a data center server), a load balancer, and/or a similar device. In some implementations, the network device 220 may be a physical device implemented within a housing, such as a chassis. In some implementations, the network device 220 may be a virtual device implemented by one or more computer devices of a cloud computing environment or a data center. In some implementations, a group of network devices 220 may be a group of data center nodes that are used to route traffic flow through the network 240.

The server device 230 may include one or more devices capable of receiving, generating, storing, processing, providing, and/or routing information, as described elsewhere herein. The server device 230 may include a communication device and/or a computing device. For example, the server device 230 may include a server, such as an application server, a client server, a web server, a database server, a host server, a proxy server, a virtual server (e.g., executing on computing hardware), or a server in a cloud computing system. In some implementations, the server device 230 may include computing hardware used in a cloud computing environment.

The network 240 includes one or more wired and/or wireless networks. For example, the network 240 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
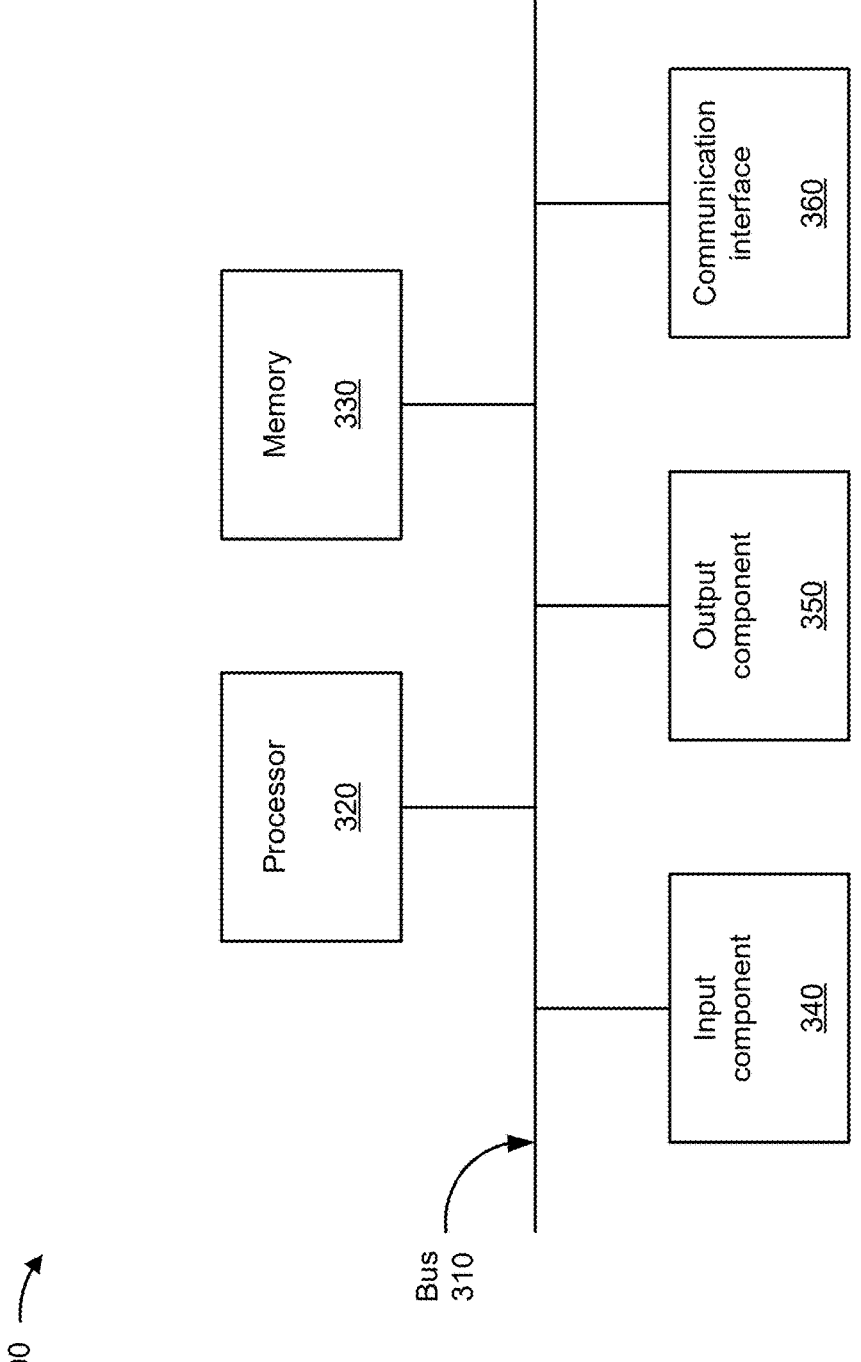
FIGS. 3 and 4 are diagrams of example components of one or more devices of FIG. 2.

FIG. 3 is a diagram of example components of one or more devices of FIG. 2. The example components may be included in a device 300, which may correspond to the endpoint device 210, the network device 220, and/or the server device 230. In some implementations, the endpoint device 210, the network device 220, and/or the server device 230 may include one or more devices 300 and/or one or more components of the device 300. As shown in FIG. 3, the device 300 may include a bus 310, a processor 320, a memory 330, an input component 340, an output component 350, and a communication interface 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication interface 360 enables the device 300 to communicate with other devices via a wired connection and/or a wireless connection. For example, the communication interface 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
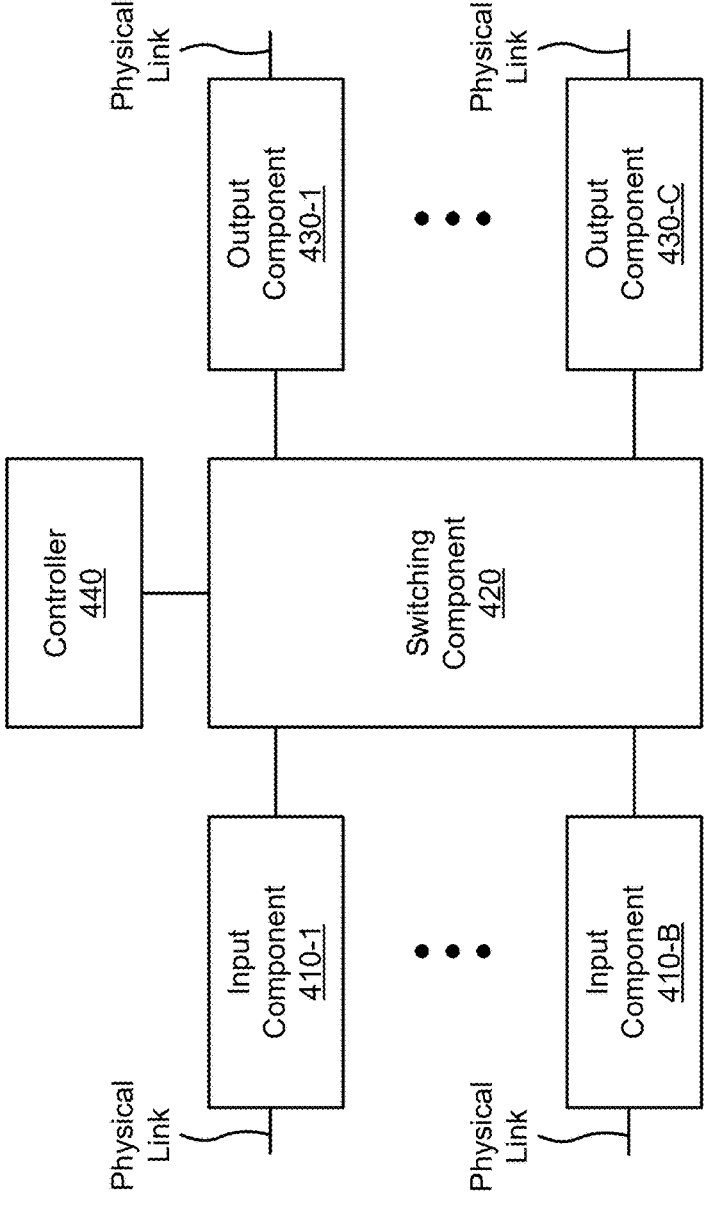

FIG. 4 is a diagram of example components of one or more devices of FIG. 2. The example components may be included in a device 400. The device 400 may correspond to the network device 220. In some implementations, the network device 220 may include one or more devices 400 and/or one or more components of the device 400. As shown in FIG. 4, the device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

The input component 410 may be one or more points of attachment for physical links and may be one or more points of entry for incoming traffic, such as packets. The input component 410 may process incoming traffic, such as by performing data link layer encapsulation or decapsulation. In some implementations, the input component 410 may transmit and/or receive packets. In some implementations, the input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, the device 400 may include one or more input components 410.

The switching component 420 may interconnect the input components 410 with the output components 430. In some implementations, the switching component 420 may be implemented via one or more crossbars, via busses, and/or with shared memories. The shared memories may act as temporary buffers to store packets from the input components 410 before the packets are eventually scheduled for delivery to the output components 430. In some implementations, the switching component 420 may enable the input components 410, the output components 430, and/or the controller 440 to communicate with one another.

The output component 430 may store packets and may schedule packets for transmission on output physical links. The output component 430 may support data link layer encapsulation or decapsulation, and/or a variety of higher-level protocols. In some implementations, the output component 430 may transmit packets and/or receive packets. In some implementations, the output component 430 may include an output line card that includes one or more packet processing components (e.g., in the form of integrated circuits), such as one or more IFCs, packet forwarding components, line card controller components, output ports, processors, memories, and/or output queues. In some implementations, the device 400 may include one or more output components 430. In some implementations, the input component 410 and the output component 430 may be implemented by the same set of components (e.g., and input/output component may be a combination of the input component 410 and the output component 430).

The controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, the controller 440 may include one or more processors that can be programmed to perform a function.

In some implementations, the controller 440 may include a RAM, a ROM, and/or another type of dynamic or static storage device (e.g., a flash memory, a magnetic memory, an optical memory, etc.) that stores information and/or instructions for use by the controller 440.

In some implementations, the controller 440 may communicate with other devices, networks, and/or systems connected to the device 400 to exchange information regarding network topology. The controller 440 may create routing tables based on the network topology information, may create forwarding tables based on the routing tables, and may forward the forwarding tables to the input components 410 and/or output components 430. The input components 410 and/or the output components 430 may use the forwarding tables to perform route lookups for incoming and/or outgoing packets.

The controller 440 may perform one or more processes described herein. The controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with the controller 440 from another computer-readable medium or from another device via a communication interface. When executed, software instructions stored in a memory and/or storage component associated with the controller 440 may cause the controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, the device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 is a flowchart of an example process 500 for providing group-based policy encoding for network virtualization overlays. In some implementations, one or more process blocks of FIG. 5 may be performed by a network device (e.g., the network device 220). In some implementations, one or more process blocks of FIG. 5 may be performed by another device or a group of devices separate from or including the network device, such as an endpoint device (e.g., the endpoint device 210) and/or a server device (e.g., the server device 230). Additionally, or alternatively, one or more process blocks of FIG. 5 may be performed by one or more components of the device 300, such as the processor 320, the memory 330, the input component 340, the output component 350, and/or the communication interface 360. Additionally, or alternatively, one or more process blocks of FIG. 5 may be performed by one or more components of the device 400, such as the input component 410, the switching component 420, the output component 430, and/or the controller 440.

As shown in FIG. 5, process 500 may include encoding a source TSI group identifier into a tag protocol identifier and a group-based policy identifier (block 510). For example, the first network device may encode a source TSI group identifier into a tag protocol identifier and a group-based policy identifier, as described above. In some implementations, the source TSI group identifier includes the tag protocol identifier and the group-based policy identifier. In some implementations, the source TSI group identifier includes a group-based policy tag format.

As further shown in FIG. 5, process 500 may include encoding the tag protocol identifier and the group-based policy identifier into a VXLAN packet with the source TSI group identifier, wherein the source TSI group identifier is not included in a header of the VXLAN packet (block 520). For example, the first network device may encode the tag protocol identifier and the group-based policy identifier into a VXLAN packet with the source TSI group identifier, as described above. In some implementations, the source TSI group identifier is not included in a header of the VXLAN packet. In some implementations, the VXLAN packet includes an outer Ethernet header, an outer Internet protocol header, an outer user datagram protocol header, an outer VXLAN header, an inner destination MAC address, an inner source MAC address, a VLAN tag, the source TSI group identifier, and/or an inner payload. In some implementations, the source TSI group identifier is included in a payload of the VXLAN packet.

As further shown in FIG. 5, process 500 may include providing the VXLAN packet, with the source TSI group identifier, to a second network device of a second data center, via an EVPN MPLS network (block 530). For example, the first network device may provide the VXLAN packet, with the source TSI group identifier, to a second network device of a second data center, via an EVPN MPLS network, as described above. In some implementations, providing the VXLAN packet to the second network device includes providing the VXLAN packet to a first gateway of the first data center to cause the first gateway to decapsulate the VXLAN packet to generate a decapsulated packet, encapsulate the decapsulated packet into an EVPN MPLS packet, and provide the EVPN MPLS packet to the EVPN MPLS network. In some implementations, the second network device is to apply a policy associated with the source TSI group identifier of the VXLAN packet. In some implementations, the policy is associated with one or more of service chaining, quality of service, path properties, or access control. In some implementations, the first network device is a leaf network device of the first data center, and the second network device is a leaf network device of the second data center. In some implementations, the EVPN MPLS network is an EVPN MPLS tunnel provided in a wide area network.

In some implementations, the EVPN MPLS network is to provide the EVPN MPLS packet to a second gateway of the second data center. In some implementations, the second gateway is to decapsulate the EVPN MPLS packet to generate another decapsulated packet, and encapsulate the other decapsulated packet into the VXLAN packet. In some implementations, the second gateway is to provide the VXLAN packet with the source TSI group identifier to the second network device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
encoding, by a first network device of a first data center, a source tenant system interface (TSI) group identifier into a tag protocol identifier and a group-based policy identifier;
encoding, by the first network device, the tag protocol identifier and the group-based policy identifier into a virtual extensible local area network (VXLAN) packet with the source TSI group identifier,
wherein the source TSI group identifier is not included in a header of the VXLAN packet; and
providing, by the first network device, the VXLAN packet, with the source TSI group identifier, to a second network device of a second data center, via an Ethernet virtual private network (EVPN) multiprotocol label switching (MPLS) network.

2. The method of claim 1, wherein providing the VXLAN packet to the second network device comprises:
providing the VXLAN packet to a first gateway of the first data center to cause the first gateway to decapsulate the VXLAN packet to generate a decapsulated packet, encapsulate the decapsulated packet into an EVPN MPLS packet, and provide the EVPN MPLS packet to the EVPN MPLS network.

3. The method of claim 2, wherein the EVPN MPLS network is to provide the EVPN MPLS packet to a second gateway of the second data center.

4. The method of claim 3, wherein the second gateway is to decapsulate the EVPN MPLS packet to generate another decapsulated packet, and encapsulate the other decapsulated packet into the VXLAN packet.

5. The method of the claim 4, wherein the second gateway is to provide the VXLAN packet with the source TSI group identifier to the second network device.

6. The method of claim 1, wherein the second network device is to apply a policy associated with the source TSI group identifier of the VXLAN packet.

7. The method of claim 6, wherein the policy is associated with one or more of service chaining, quality of service, path properties, or access control.

8. A first network device of a first data center, the first network device comprising:
one or more memories; and
one or more processors to:
encode a source tenant system interface (TSI) group identifier into a tag protocol identifier and a group-based policy identifier;
encode the tag protocol identifier and the group-based policy identifier into a virtual extensible local area network (VXLAN) packet with the source TSI group identifier,
wherein the source TSI group identifier is not included in a header of the VXLAN packet; and
provide the VXLAN packet, with the source TSI group identifier, to a second network device of a second data center, via an Ethernet virtual private network (EVPN) multiprotocol label switching (MPLS) network,
wherein the second network device is to apply a policy associated with the source TSI group identifier of the VXLAN packet.

9. The first network device of claim 8, wherein the source TSI group identifier includes the tag protocol identifier and the group-based policy identifier.

10. The first network device of claim 8, wherein the source TSI group identifier includes a group-based policy tag format.

11. The first network device of claim 8, wherein the VXLAN packet includes an outer Ethernet header, an outer Internet protocol header, an outer user datagram protocol header, an outer VXLAN header, an inner destination media access control (MAC) address, an inner source MAC address, a VLAN tag, the source TSI group identifier, and/or an inner payload.

12. The first network device of claim 8, wherein the first network device is a leaf network device of the first data center, and the second network device is a leaf network device of the second data center.

13. The first network device of claim 8, wherein the source TSI group identifier is included in a payload of the VXLAN packet.

14. The first network device of claim 8, wherein the EVPN MPLS network is an EVPN MPLS tunnel provided in a wide area network.

15. A non-transitory computer-readable medium storing a set of instructions, the set of instructions comprising:
one or more instructions that, when executed by one or more processors of a first network device of a first data center, cause the first network device to:
encode a source tenant system interface (TSI) group identifier into a tag protocol identifier and a group-based policy identifier;
encode the tag protocol identifier and the group-based policy identifier into a virtual extensible local area network (VXLAN) packet with the source TSI group identifier,
wherein the source TSI group identifier is included in a payload of the VXLAN packet; and
provide the VXLAN packet, with the source TSI group identifier, to a second network device of a second data center, via an Ethernet virtual private network (EVPN) multiprotocol label switching (MPLS) network.

16. The non-transitory computer-readable medium of claim 15, wherein the one or more instructions, that cause the first network device to provide the VXLAN packet to the second network device, cause the first network device to:
provide the VXLAN packet to a first gateway of the first data center to cause the first gateway to decapsulate the VXLAN packet to generate a decapsulated packet, encapsulate the decapsulated packet into an EVPN MPLS packet, and provide the EVPN MPLS packet to the EVPN MPLS network.

17. The non-transitory computer-readable medium of claim 15, wherein a second gateway of the second data center is to provide the VXLAN packet with the source TSI group identifier to the second network device.

18. The non-transitory computer-readable medium of claim 17, wherein the second network device is to apply a policy associated with the source TSI group identifier of the VXLAN packet,
wherein the policy is associated with one or more of service chaining, quality of service, path properties, or access control.

19. The non-transitory computer-readable medium of claim 15, wherein the source TSI group identifier includes the tag protocol identifier and the group-based policy identifier.

20. The non-transitory computer-readable medium of claim 15, wherein the VXLAN packet includes an outer Ethernet header, an outer Internet protocol header, an outer user datagram protocol header, an outer VXLAN header, an inner destination media access control (MAC) address, an inner source MAC address, a VLAN tag, the source TSI group identifier, and/or an inner payload.

* * * * *